(12) United States Patent
Gong et al.

(10) Patent No.: US 10,747,563 B2
(45) Date of Patent: Aug. 18, 2020

(54) OPTIMIZING MEMORY SHARING IN A VIRTUALIZED COMPUTER SYSTEM WITH ADDRESS SPACE LAYOUT RANDOMIZATION (ASLR) ENABLED IN GUEST OPERATING SYSTEMS WHEREIN SAID ASLR IS ENABLE DURING INITIALIZATION OF A VIRTUAL MACHINE, IN A GROUP, WHEN NO OTHER VIRTUAL MACHINES ARE ACTIVE IN SAID GROUP

(71) Applicant: VMware, Inc., Palo Alto, CA (US)

(72) Inventors: Guang Gong, Beijing (CN); Qi Kang, Beijing (CN); Le Tian, Beijing (CN); Chengxiao Wang, Beijing (CN); Yimin Zhao, Beijing (CN); Shiyao Yuan, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/216,812

(22) Filed: Mar. 17, 2014

(65) Prior Publication Data
US 2015/0261576 A1 Sep. 17, 2015

(51) Int. Cl.
G06F 9/455 (2018.01)
G06F 12/02 (2006.01)

(52) U.S. Cl.
CPC ........ *G06F 9/45558* (2013.01); *G06F 12/023* (2013.01); *G06F 2009/45583* (2013.01); *G06F 2212/1044* (2013.01); *G06F 2212/1052* (2013.01); *G06F 2212/152* (2013.01); *G06F 2212/657* (2013.01)

(58) Field of Classification Search
CPC combination set(s) only.
See application file for complete search history.

(56) References Cited

U.S. PATENT DOCUMENTS 4,660,130 A * 4/1987 Bartley et al. ................ 711/209
7,567,188 B1 * 7/2009 Anglin et al. .................. 341/63
(Continued)

OTHER PUBLICATIONS

Sean Barker, Timothy Wood, Prashant Shenoy, Ramesh Sitaraman, An empirical study of memory sharing in virtual machines, Proceedings of the 2012 USENIX conference on Annual Technical Conference, p. 25-25, Jun. 13-15, 2012, Boston, MA.*

*Primary Examiner* — William B Partridge
*Assistant Examiner* — Chie Yew
(74) *Attorney, Agent, or Firm* — Patterson + Sheridan, LLP

(57) ABSTRACT

Systems and techniques are described for optimizing memory sharing. A described technique includes grouping virtual machines (VMs) into groups including a first group; initializing a first VM in the first group, wherein initializing the first VM includes identifying, for each of one or more first memory pages for the first VM, a respective base address for storing the first memory page using an address randomization technique, and storing, for each of the one or more first memory pages, data associating the first memory page with the respective base address for the first group, and initializing a second VM while the first VM is active, wherein initializing the second VM includes determining that the second VM is a member of the first group, and in response, storing one or more second memory pages for the second VM using the respective base addresses stored for the first group.

12 Claims, 4 Drawing Sheets

(56) References Cited

U.S. PATENT DOCUMENTS

| | | | |
|---|---|---|---|
| 8,510,596 B1* | 8/2013 | Gupta | G06F 11/073 714/15 |
| 8,671,082 B1* | 3/2014 | Yadav et al. | 707/692 |
| 2005/0138370 A1* | 6/2005 | Goud | G06F 21/57 713/164 |
| 2007/0074208 A1* | 3/2007 | Ling | G06F 9/45558 718/1 |
| 2008/0016314 A1* | 1/2008 | Li et al. | 711/200 |
| 2008/0270739 A1* | 10/2008 | Hamilton | G06F 12/1036 711/206 |
| 2010/0030998 A1* | 2/2010 | Kiriansky | 711/206 |
| 2010/0107159 A1* | 4/2010 | Radhakrishnan | G06F 9/5055 718/1 |
| 2010/0131480 A1* | 5/2010 | Schneider | 707/698 |
| 2010/0161908 A1* | 6/2010 | Nation et al. | 711/147 |
| 2010/0198797 A1* | 8/2010 | Wideman | G06F 17/30156 707/692 |
| 2011/0066786 A1* | 3/2011 | Colbert | G06F 9/45558 711/6 |
| 2013/0091318 A1* | 4/2013 | Bhattacharjee | G06F 12/1475 711/6 |
| 2013/0138863 A1* | 5/2013 | Tsirkin et al. | 711/6 |
| 2013/0290645 A1* | 10/2013 | Van De Ven | G06F 9/44521 711/147 |

* cited by examiner

OPTIMIZING MEMORY SHARING IN A VIRTUALIZED COMPUTER SYSTEM WITH ADDRESS SPACE LAYOUT RANDOMIZATION (ASLR) ENABLED IN GUEST OPERATING SYSTEMS WHEREIN SAID ASLR IS ENABLE DURING INITIALIZATION OF A VIRTUAL MACHINE, IN A GROUP, WHEN NO OTHER VIRTUAL MACHINES ARE ACTIVE IN SAID GROUP

BACKGROUND

This document relates to optimizing memory sharing in a virtualized computer system having multiple virtual machines wherein address space layout randomization (ASLR) or a similar technique is enabled in guest operating systems.

A virtual machine is a software-based abstraction of a physical computer system. In general, a computer program that can be executed on a physical computer system can be executed in a virtual machine using virtualization software. Virtualization software is software that is logically interposed and interfaces with a virtual machine and a physical computer system. Each virtual machine is configured to execute an operating system, referred to herein as a guest OS, and applications. A physical computer system, referred to herein as a host machine, can execute one or more virtual machines.

Virtualization software can allow two or more virtual machines to share memory pages. For example, a first virtual machine may use a system page having identical content as a system page used by a second virtual machine. The virtualization software can reduce the amount of memory used by the virtual machines by determining that the two virtual memory pages include identical content and only storing a single copy of the memory page in hardware memory, i.e., rather than storing an individual copy of the memory page for each virtual machine.

Some guest operating systems implement a computer security technique to protect from buffer overflow attacks. The security technique randomly arranges the positions of key data areas if a program, including the base of the executable and the positions of the stack, heap, and libraries in a process's address space, in order to prevent an attacker from reliably jumping to a particular exploited function in memory. However, using ASLR and similar techniques can cause the content of two memory pages that would otherwise be identical to be different. Thus, the number of memory pages that can be shared by virtualization software may be reduced as a result of using ASLR.

For example, certain Windows operating systems (such as Windows Vista) have a security feature referred to as ASLR, which is enabled by default. When this security feature is enabled, certain system drivers (.sys) and dynamic load libraries (.dll) are loaded to randomized base address. Thus, a particular .sys or .dll file has different base addresses in two virtual machines each running a copy of the Windows Vista operating system. As a result, the code section of a specific module, which makes calls to the particular .sys or .dll file, has different content, when stored on these two virtual machines. Therefore, the memory page storing the code section of the specific module thus cannot be shared between the virtual machines.

SUMMARY

In general, one aspect of the subject matter described in this document can be embodied in a technique that includes grouping virtual machines into one or more groups including at least a first group; initializing a first virtual machine in the first group, wherein initializing the first virtual machine includes: identifying, for each of one or more first memory pages for the first virtual machine, a respective base address for storing the first memory page using an address randomization technique; and storing, for each of the one or more first memory pages, data associating the first memory page with the respective base address for the first group; and initializing a second virtual machine while the first virtual machine is active, wherein initializing the second virtual machine includes: determining that the second virtual machine is a member of the first group, and in response to determining that the second virtual machine is a member of the first group, storing one or more second memory pages for the second virtual machine that have identical content to the one or more first memory pages using the respective base addresses previously stored for the first group, rather than identifying different base addresses for the second memory pages using the address randomization technique.

These and other aspects can optionally include one or more of the following features. In some aspects, initializing the first virtual machine includes determining, prior to identifying the respective base address for each of the one or more first memory pages, that no other virtual machine in the first group is active. The respective base address for each of the one or more first memory pages can be identified using the address randomization technique in response to determining that no other virtual machine of the first group is active.

Aspects can further include initiating a third virtual machine. Initiating the third virtual machine can include determining that the third virtual machine is a first active member of a second group and is not a member of the first group; and in response to determining that the third virtual machine is a first active member of a second group and is not a member of the first group: identifying, for each of one or more third memory pages for the third virtual machine that have identical content to the one or more first memory pages, a respective base address for storing the third memory pages using the address randomization technique; and storing the one or more third memory pages using the respective base addresses for the third memory pages.

Aspects can further include determining that each virtual machine in the first group has become inactive; and deleting, for each of the one or more first memory pages, the data associating the first memory page with the respective base address for the first memory page in response to determining that each virtual machine of the first group has become inactive.

In some implementations, identifying a respective base address for each of the one or more first memory pages includes receiving memory location data from a guest operating system of the first virtual machine in response to initializing the first virtual machine. The memory location data can specify the respective base address for the each of the one or more first memory pages.

In some aspects, the guest operating system of the first virtual machine selected the respective base address for each of the one or more memory pages using the address randomization technique. In some implementations, the one or more first memory pages include at least one of the following: a system module, an executable, a stack, a heap, a library, a system driver, and a dynamic load library. In some aspects, the one or more first memory pages is subject to an address randomization feature of a guest operating system on the first virtual machine.

Particular embodiments of the subject matter described in this document can be implemented so as to realize one or more of the following advantages. By randomizing where certain system files are stored so that virtual machines (VMs) in different groups may store the same system files to different locations but VMs of the same groups store the same system files to the same location, an acceptable level of security can be maintained while improving memory sharing.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Certain implementations as will be described below relate to optimizing memory sharing in a virtualized computer system having multiple virtual machines wherein address randomization or similar technique is enabled in guest operating systems. In some implementations, a virtualization layer on a host machine manages a plurality of virtual machines. The virtualization layer may divide the virtual machines (VMs) into groups for address randomization. For a particular module such as ntdll.dll or disk.sys, VMs within a group store it to the same base address, so more memory may be shared within the group of VMs. The system module's base addresses are different between groups and also different from VMs whose address randomization is disabled, so it's more secure than disabling address randomization completely.

In some implementations, the virtualization layer divides VMs into groups and saves the group information to a host configuration file. In some implementations, a group randomization driver is installed in guest operating systems for each the VMs subject to the grouped address randomization approach. In some implementations, the VMs may be grouped so that VMs in the same group have the same guest OS, allowing more memory sharing within the group.

In some implementations, when a VM is booted, the group randomization driver firstly reads group information from the configuration file. If it's not in any group, then the VM starts normally with address randomization enabled. If it's in a group, the VM will read the number of powered-on VMs from the configuration file and judge whether it's the first booted VM for the group. If it is, the VM will start normally, using address randomization feature of the guest OS to assign a random base address to the system module. The address randomization driver also communicates with the virtualization layer which then saves the assigned base address of the system module to the configuration file to be associated with the corresponding group. If it is not the first booted VM, rather than randomly allocating a base address for the system module using the address randomization technique in the guest OS, the group randomization driver on the VM reads the saved base address for the group and uses it to instruct the guest OS to load the module in the saved base address.

In some implementations, the virtualization layer keeps record of the number of powered-on VMs for each group. The virtualization layer adjusts the number accordingly each time a VM in a group powers on or off. The virtualization layer also cleans the base address for a group in the record, if the number of the powered-on VMs in the group is decreased to zero.

Figure 1:
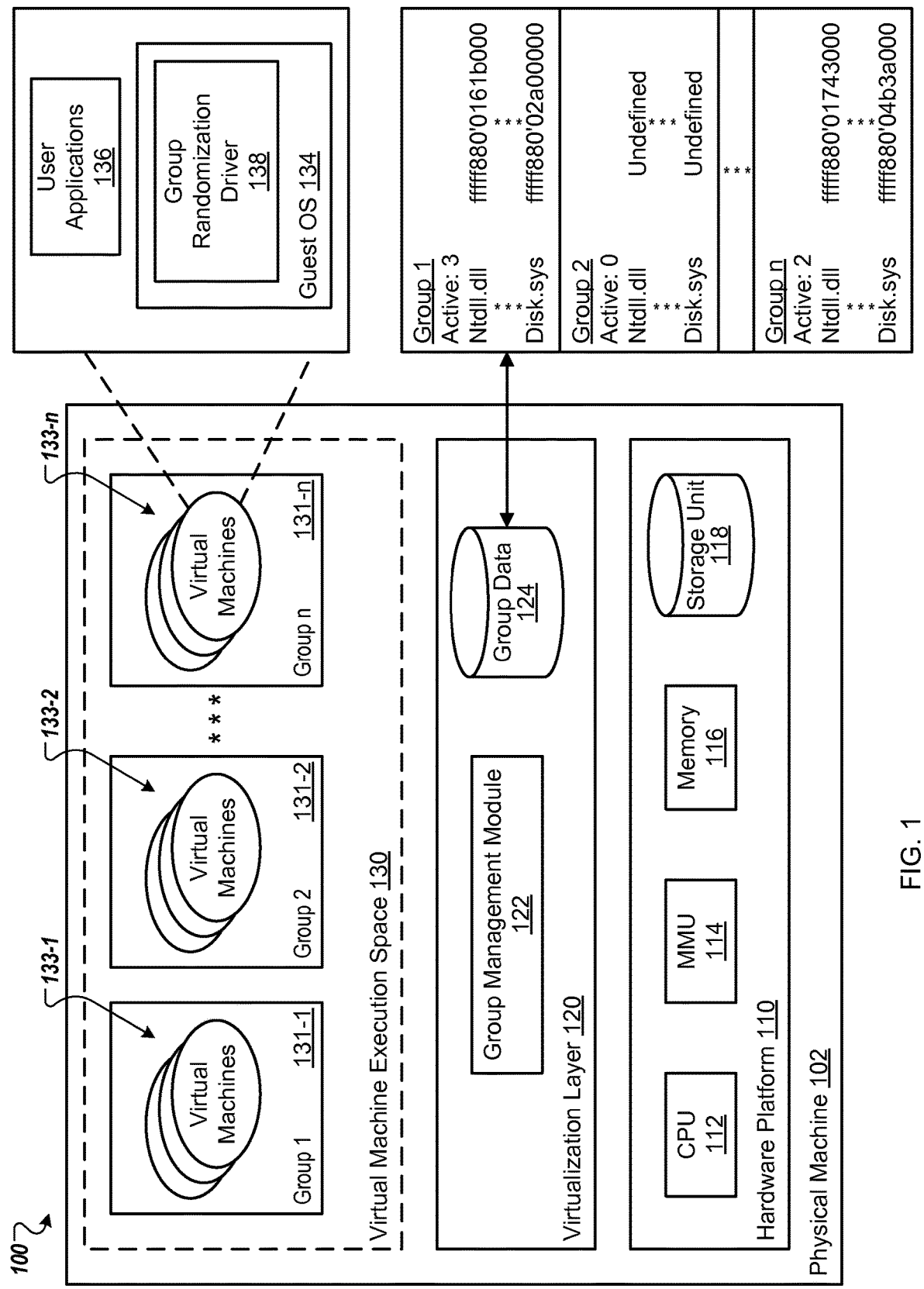
FIG. 1 shows an architecture for an example system that is configured to manage the execution of virtual machines.

FIG. 1 shows an architecture for an example system 100 that is configured to manage the execution of VMs. In the system 100, a physical machine 102 is configured to execute VMs 133-1-133-$n$ that are included in groups 131-1-131-$n$, respectively, using a virtualization layer 120 (e.g., a hypervisor or virtual machine monitor). The physical machine 102 is one or more data processing apparatus that each includes a hardware platform 110. The hardware platform 110 may include, for example, a processor (CPU) 112, a memory management unit (MMU) 114, memory 116 (e.g. Random Access Memory (RAM), a storage unit 118, a network adapter, and so on.

The virtualization layer 120 is a virtualization software layer that executes on the hardware platform 110. The virtualization layer 120 manages a virtual machine execution space 130 within which one or more VMs 133-1-133-$n$ may be concurrently instantiated and executed. For each VM 133-1-133-$n$, the virtualization layer 120 manages a corresponding virtual hardware platform. Each virtual hardware platform includes emulated hardware, e.g., a virtual storage device, a virtual network adapter/interface, virtual memory, a virtual processor, and so on.

Each VM 133-1-133-$n$ managed by the virtualization layer 120 executes a guest operating system, e.g., guest OS 134, that executes user applications, e.g., user applications 136. The virtualization layer 120 transforms input/output (I/O) requests from the guest operating systems to the corresponding virtual hardware platform into corresponding requests to the hardware platform 110. The virtualization layer 120 can be configured to manage VMs having different types of operating systems. For example, the virtualization layer 120 may be configured to concurrently manage VMs executing a Windows OS and VMs executing a Linux OS.

The requests transformed by the virtualization layer 120 can include requests to access and store data in memory 116 and/or the local storage unit 118. For example, when a user application 136 stores data in virtual memory, the virtualization layer 120 can store the data in the memory 116 of the hardware platform, for example, based on a mapping of virtual memory to hardware memory. The VMs 133-1-133-$n$ can also load modules, files, libraries, drivers, and other data for use by the user applications 136 and/or the guest OS 134. For example, when a VM is initialized, operating system modules for the guest OS 134 may be stored in memory 116 and loaded into the VM (e.g., into its virtual memory) for use by the guest OS 134.

The modules, files, libraries, drivers, and other data and files for a virtual machine (or group of virtual machines) can be stored as memory units or memory pages in virtual memory and in a corresponding location in the hardware memory. For example, each application module to be used by a guest OS or a user application may be stored as one or more memory pages in virtual memory and in the memory 116 or the local storage unit 118.

In a virtualized computer system, there may be three different types of memory addresses: a virtual page number (VPN) which is associated with a subsystem running on a guest OS of a VM, a physical page number (PPN) which refers to a virtualized physical memory space associated with the guest OS running in a VM, and a machine page number (MPN) which refers to actual hardware memory 116. The guest OS of a VM operates as though the PPN refers to actual hardware memory, although it is actually a software construct maintained by the virtualization layer. The guest OS specifies mappings from VPNs to PPNs. The virtualization layer, for example, a hypervisor, specifies mappings from each VM's PPNs to MPNs.

In some implementations, the VMs 133-1-133-$n$ can be grouped into groups 131-1-131-$n$, for example, based on common characteristics between the VMs or based on common system modules used by the VMs. In some implementations, the VMs 133-1-133-$n$ are grouped based on the type and/or version of guest OS. For example, VMs that execute a particular version of a Windows OS may be grouped together in group 131-1, while VMs that execute a different version of Windows may be grouped together in group 131-2. Similarly, VMs that execute a particular version of Linux may be grouped into another group that is different from group 131-1 and group 131-2.

In some implementations, an administrator, system designer, or other user, may assign VMs to groups. For example, a group management module 122 of the virtualization layer 120 may provide a user interface that enables the users to group VMs 133-1-133-$n$ into one or more groups 131-1-131-$n$.

The group management module 122 also manages the VMs 133-1-133-$n$ and the grouped address randomization. The group management module 122 can receive data specifying the assignment of VMs to groups, e.g., from the provided user interface, and store the data in a group data index 124. The group data index 124 stores data identifying each group and, for each group, data identifying the VMs assigned to the group and the number of active VMs. An active VM is a VM that has been initialized by the virtualization layer 120 and is currently executing. For example, as shown in FIG. 1, Group 1 has three active VMs; Group 2 has no active VMs, and Group n has 2 active VMs. The group data index 124 may be a host configuration file stored in memory 116 or the local storage unit 118 of the hardware platform.

For each group of VMs, the group data index 124 also stores data that associates a particular module (e.g., for system modules, libraries, etc.) with the assigned base address. In some implementations, the assigned base address is a VPN. In another implementation, the assigned base address may be a PPN or a MPN. For example, the group data index 124 may store a base address for each module, which is subject to address randomization of the guest OS, for each group. In some implementations, the data specify the base address of the module in the memory space of the guest OS running on a virtual machine. The virtualization layer 120 can also store data that maps these locations in virtual memory to the hardware memory 116 and/or the local storage unit 118.

The virtualization layer 120 can install a group randomization driver 138 into the guest OS 134 of a VM (or another location in the VM) that ensures that the VM uses the same base address for a particular module as other VMs in the same group. For example, the virtualization layer 120 may install the group randomization driver 138 when it initializes the VM. The group randomization driver 138 can interact with the group data index 124 to obtain and store memory location data. For example, the group randomization driver 138 can retrieve data from the group data index 124 that specifies the memory address (e.g., base address) of a system module for the group to which the VM is assigned. The guest OS 134 can use this data to assign the address for the system module. Similarly, the group randomization driver 138 can provide data to the group data index 124 that specifies the memory address in which the guest OS 134 is storing the system module.

The system 100 can be configured such that a system module for each group is stored in random or pseudo-random locations in virtual memory of the guest OS. For example, the guest OS for a VM may store application modules, libraries and other data using ASLR or other type of address randomization technique that randomly arranges the position of data in memory. The virtualization layer 120 may initialize the VMs with the address randomization technique active, which allows the guest OS to attempt to store the system module in random virtual memory locations. When a first VM of a group is initialized (e.g., no other VMs of the group are active at the time that the VM is initialized), the guest OS of this VM may identify a location (e.g., a random location) in virtual memory for a system module and store the system module in virtual memory at the identified memory locations. In addition, the group randomization driver 138 can store data associating the system module with its corresponding virtual memory location specified by the guest OS in the group data index 124 so that other VMs assigned to the same group as the VM can assign the module to the same virtual memory address in its respective guest OS.

In some implementations, the virtualization layer 120 may deactivate the ASLR or other address randomization techniques of the guest OS 134. In such implementations, the group randomization driver 138 may identify random or pseudo random locations in virtual memory for a system module of a VM. For example, the group randomization driver 138 may instruct the guest OS 134 as to what memory location (or base address) to store each system module.

When a second VM (or third or other subsequent VM) of the group is initialized while the first VM (or another VM of the group) is active, the group randomization driver 138 of the second VM can access the group data index 124 to identify the memory location for the system module already assigned to the group rather than identifying new random locations. For example, when the second VM is initialized, the group randomization driver 138 may access the group data index 124 to identify the group to which the second VM is assigned and determine whether there are any other VMs of the group already active (e.g., based on the VM count in the group data index 124). If there is at least one other VM of the group active, then the group randomization driver 138 may use the stored base address for the system module. The group management module 122 can remove or delete the associations of an address to a system module in the group data index 124 for a group when the VMs of the group become inactive.

To illustrate the grouping technique, Group 1 has three VMs active. If the virtualization layer 120 initializes a fourth VM that is assigned to Group 1, then the group randomization driver 138 of the fourth VM may assign a system module to the memory locations identified in the group data index 124 as there are three VMs of Group 1 active. For example, the virtualization layer may load a "Disk.sys"

module into virtual memory for the fourth VM from a memory location having a base address of "ffffff880'02a00000."

Figure 4:
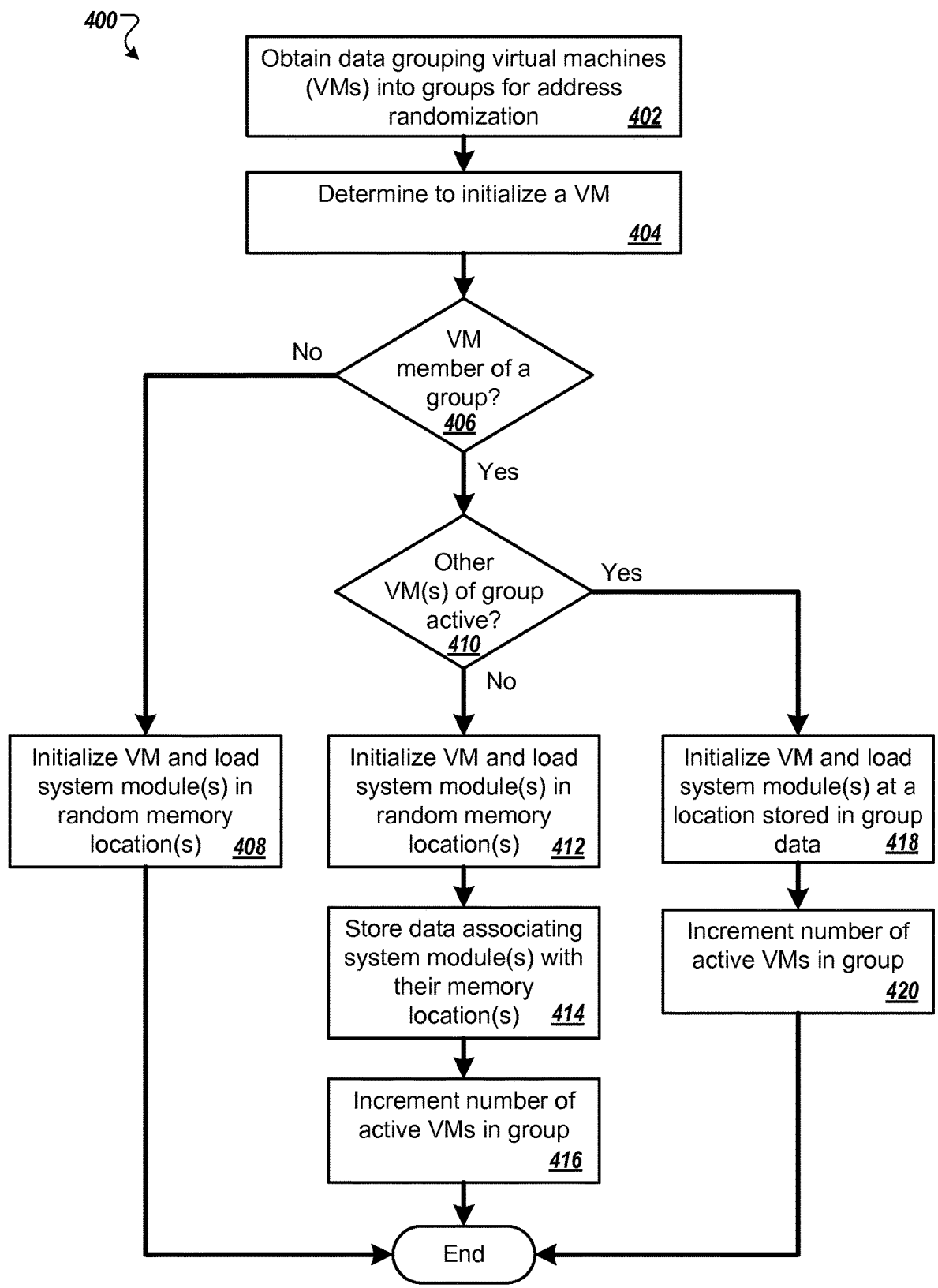
FIG. 4 is a flow chart of an example technique for initiating a virtual machine.
Figure 5:
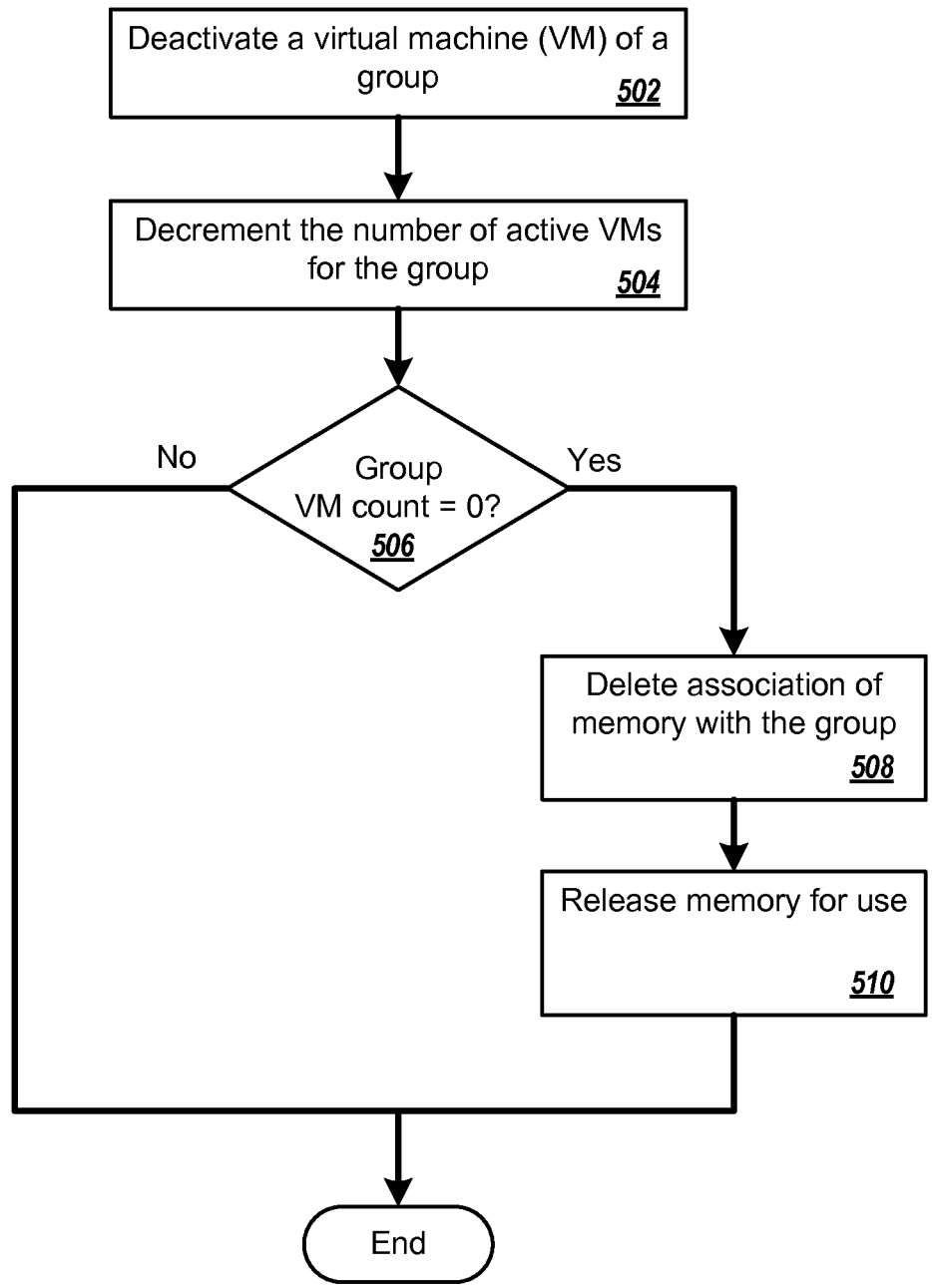
FIG. 5 is a flow chart of an example technique for deactivating a virtual machine that is assigned to a group.

If the virtualization layer initializes a VM that is assigned to Group 2, the group management module 122 may instruct the group randomization driver 138 of the VM to allow the guest OS 134 to identify random locations in memory for the system module as no other VMs of Group 2 are active at the time of initialization. For example, the group data index 124 may not have memory location assigned for the system module for the group as any previous memory location data may have been cleared in response to the VMs of Group 2 becoming inactive. The group randomization driver 138 can then store data specifying the random memory location picked for the system module by the OS running on this VM to the group data index 124. Example techniques for managing address assignment for a particular system module for groups of VMs are illustrated in FIGS. 4 and 5 and described in detail below.

Figure 2:
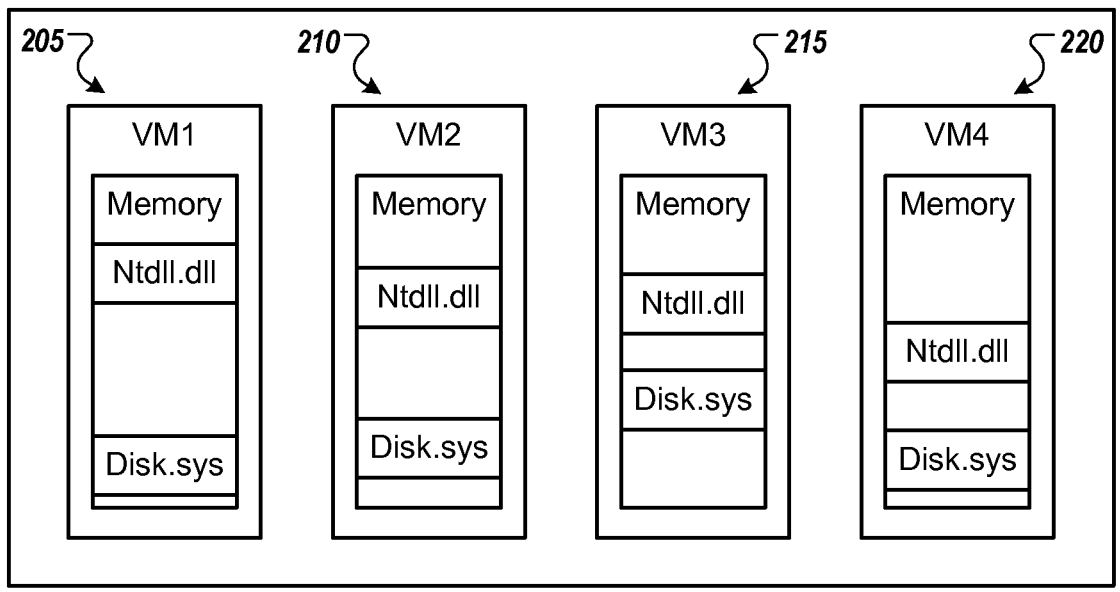
FIG. 2 shows an example positioning of system modules for VMs that have not been grouped.
Figure 3:
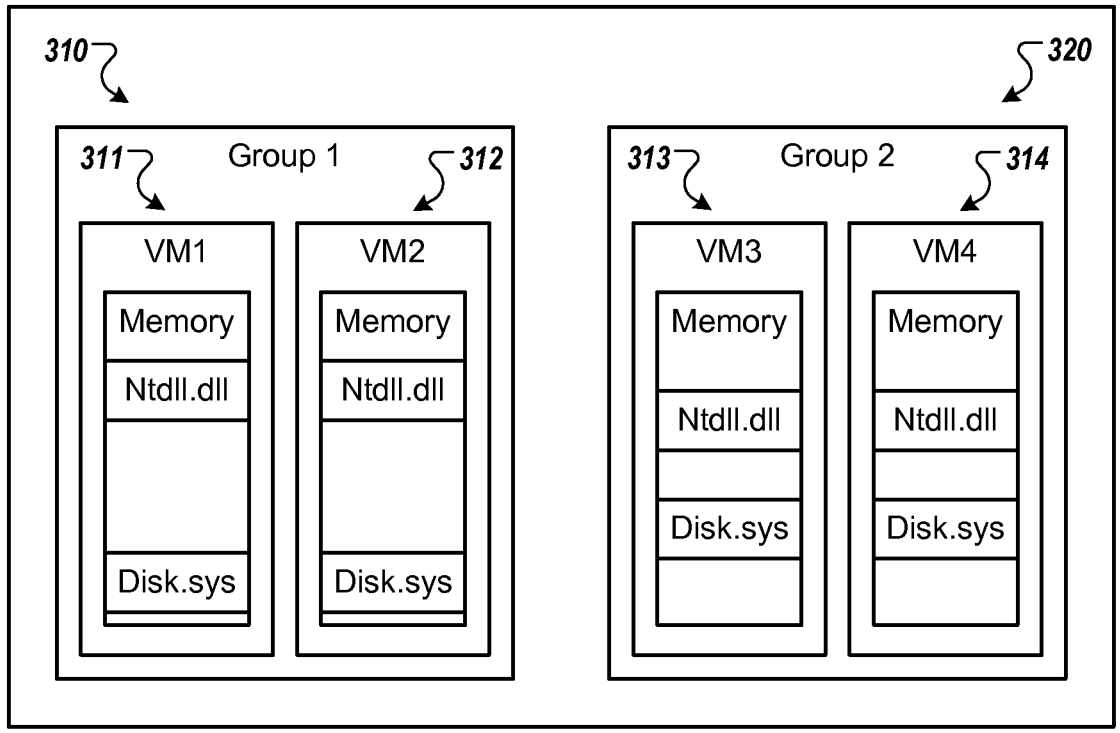
FIG. 3 shows an example positioning of system modules for virtual machines that have been grouped.

FIGS. 2 and 3 illustrate some advantages to sharing memory between VMs that are grouped together for address randomization. As an example, FIGS. 2 and 3 illustrate how the amount of available memory can be improved by sharing memory pages between VMs of a group. FIGS. 2 and 3 also illustrate how this memory sharing can be increased without compromising security by locating the shared memory pages in random memory locations between different groups.

FIG. 2 shows an example positioning 200 of system modules for VMs that have not been grouped. The system module positioning 200 shows the relative positions in memory of a module "Disk.sys" and a dynamic load library "Ntdll.dll" for four VMs 205-220. For example, a virtualization layer may initialize VM1 205 and the guest OS for VM1 205 may load memory pages, such as memory pages for Disk.sys and NTdll.dll, into memory at random locations within the memory. The guest OS may use an ASLR technique to load the memory pages into memory such that each memory page has a base address that is selected randomly or pseudo-randomly.

Similarly, the guest OS for each other VM 210-220 may also load memory pages into memory at random locations. Some of the memory pages for the VMs 210-220 may be the same as the memory pages for the VM 205. For example, if the VMs 205-220 have the same type and version of guest OS, some modules and libraries used by the guest OS may be the same. Without grouping, each of these same modules and libraries may be loaded into four separate random memory locations such that the VMs cannot share the modules and files. This is illustrated by the differing memory locations for the Disk.sys module and the Ntdll.dll library for each VM 205-220. By loading the same memory pages for all four VMs 205-210 into four different memory locations, four times the amount of memory necessary is used to store the memory pages.

FIG. 3 shows an example positioning of system modules 300 for virtual machines that have been grouped. The system module positioning 300 shows the relative positions in memory of a Disk.sys module and an Ntdll.dll library for four VMs 311-314. In this example, VM1 311 and VM2 312 have been assigned to Group 1 310 and VM3 313 and VM4 314 have been assigned to Group 2. The VMs of Group 1 can share memory pages which include the same code sections calling to NTdll.dll and Disk.sys, because these two files are stored in the same location and thus the memory pages have the same content. As shown in FIG. 3, the memory location for the NTdll.dll library is the same for VM1 311 and VM2 312. Similarly, the memory location for the Disk.sys module is the same for VM1 311 and VM2 312.

Similarly, the VMs of Group 2 can also share common memory pages, which include the same code sections calling to NTdll.dll and Disk.sys, because these two files are stored in the same location and thus the memory pages have the same content. As shown in FIG. 3, the memory location for the NTdll.dll library is the same for VM3 313 and VM4 314. Similarly, the memory location for the Disk.sys module is the same for VM3 313 and VM4 314.

By grouping two VMs into each group, the memory used to store memory pages, which include the same code sections calling to NTdll.dll and Disk.sys, can be half that of the memory used in the system module positioning 200 of FIG. 2. With more VMs in each group and with more groups, the memory savings can be even greater. Further, the locations of each system module can be selected at random for each group. For example, the location of the NTdll.dll library may be selected at random when either VMs 311 or VM2 312 is initialized. Similarly, the location of the Disk.sys module may be selected at random when either VMs 311 or VM2 312 is initialized. This random address technique provides security features similar to those of ASLR and without disabling ASLR or other similar techniques in the guest OS. For example, by locating the system module in random memory locations, the data is better protected from buffer overflow attacks.

FIG. 4 is a flow chart of an example technique 400 for initiating a virtual machine. The example technique 400 is performed by a system of one or more computers. For example, the technique 400 may be performed by a virtualization layer executing on a physical machine configured to execute one or more virtual machines, e.g., the virtualization layer 120 of the physical machine 102 of FIG. 1.

The virtualization layer obtains data for grouping VMs into one or more groups (402). For example, a user (e.g., administrator) may provide data grouping VMs into groups using a user interface. The grouping data may also be stored in a group data index, such as the group data index 124 of FIG. 1, or a host configuration file stored on a hardware platform of a physical machine. The grouping data may identify groups of VMs and for each group, each VM that is assigned to the group.

The virtualization layer determines to initialize a VM (404). For example, the virtualization layer 120 may receive a request to initialize a particular VM from a user or another application or computer. In response, the virtualization layer 120 initiates a boot process for the VM.

The virtualization layer determines whether the VM is a member of a group of VMs (406). The group management module 122 may access the group data index 124 to determine whether the VM is a member of a group of VMs in response to the determination to initialize the VM. For example, the group management module 122 may compare data identifying the VM to data identifying VMs of each group to determine if there is a match. This may be done as part of, or before, the boot process for the VM. In some implementations, this determination may be made by a group randomization driver 138 of the VM after the group randomization driver is installed in the VM.

If a determination is made that the VM is not a member of a group, the virtualization layer may initialize the VM and load one or more system modules in random memory locations (408). In some implementations, the virtualization layer 120 may initialize the VM and install a group randomization driver 138 in the guest OS or another part of the VM. The group management module 122 may then instruct the group randomization driver 138 to allow the guest OS 134 to assign an address for one or more of its system modules. The guest OS 134, in turn, may use an address randomization technique, such as ASLR, to assign an address for the system modules.

In some implementations, the virtualization layer 120 may initialize the VM with the address randomization technique of the guest OS 134 deactivated. In such implementations, the group randomization driver 138 may assign an address for one or more system modules of the VM. The group randomization driver 138 may be configured to identify the memory locations randomly, pseudo-randomly, or at specified locations.

In some implementations, for VMs that are not a member of a group, the virtualization layer 120 may initialize the VM without installing the group randomization driver. In such implementations, the guest OS may assign addresses to certain system modules using (or not using) its address randomization technique.

If the VM is a member of a group, the virtualization layer determines whether other VM(s) of the group are active (410). The group management module 122 may maintain a count of the number of VMs active for each group, for example, in the group data index 124. In response to determining that the VM is a member of a group, the group management module 122 may determine whether any other VMs of the group (other than the VM that is being initialized) are already active using the VM count for the group. Alternatively, the group randomization driver 138 may determine whether any other VMs of the group are active during the boot process of the VM, e.g., by accessing the group data index 124.

If none of the other VMs of the group for which the VM is a member are active, the virtualization layer initializes the VM and loads system modules in random memory locations (412). For example, the virtualization layer 120 may initialize the VM and install a group randomization driver 138 in the guest OS or another part of the VM. The group randomization driver 138 may be configured to allow the guest OS 134 to randomly assign a memory location for each of its system modules when a VM is initialized and no other VMs of its group are active. The guest OS 134, in turn, may use an address randomization technique, such as ASLR, to identify memory locations for the system modules.

In some implementations, the virtualization layer 120 may initialize the VM with the address randomization technique of the guest OS deactivated. In such implementations, the group randomization driver 138 may identify memory locations for the memory pages of the VM. The group randomization driver 138 may be configured to identify the memory locations randomly or pseudo-randomly.

Regardless of how the memory locations are identified, the virtualization layer 120 can initialize the VM and store the system module(s) in hardware memory based on the identified virtual memory locations. The virtualization layer 120 may maintain a mapping of virtual memory locations identified by the guest OSs of virtual machines to hardware memory and store the memory pages in hardware memory based on this mapping.

The virtualization layer stores data associating system modules with their respective memory locations assigned for the group (414). For example, the group randomization driver 138 may store, in the group data index 124, data identifying each system module and data identifying the memory location for each system module. The data identifying the memory location for a system module may include a base address for the system module, which serves as a reference point for the address of the system module.

The virtualization layer increments the number of active VMs in the group (416). For example, the group management module 122 or the group randomization driver 138 may increment the VM count for the group by one to account for the VM being active.

Returning to block 410, if one or more other VMs of the group are active, the virtualization layer initializes the VM and the system module is loaded at a memory location saved for the group (418). For example, the virtualization layer 120 may initialize the VM and install a group randomization driver 138 in the guest OS 134 or another part of the VM. The group randomization driver 138 may access the group data index 124 and obtain the base address for system modules as stored for the group. The group randomization driver 138 may also instruct the guest OS to load the system modules at the base address obtained from the data for the group. The group randomization driver 138 may receive data from the virtualization layer 120 (or the group data index 124) that identifies memory locations (e.g., base addresses) for which the VM can store the system modules. In turn, the group randomization driver 138 can instruct the guest OS to load the system modules into the designated memory location.

Next, the virtualization layer increments the number of active VMs in the group (420). For example, the group management module 122 may increment the VM count for the group by one to account for the VM being active.

FIG. 5 is a flow chart of an example technique 500 for deactivating a virtual machine that is assigned to a group. The example technique 500 is performed by a system of one or more computers. For example, the technique 500 may be performed by a virtualization layer executing on a physical machine configured to execute one or more virtual machines, e.g., the virtualization layer 120 of the physical machine 102 of FIG. 1.

First, the virtualization layer deactivates a VM (502). For example, the virtualization layer 120 may receive a request to deactivate the VM. In response, the virtualization layer 120 may deactivate the VM.

Next, the virtualization layer decrements the number of active VMs for the group (504). For example, the group management module 122 (or the group randomization driver) may decrement the VM count for the group data index 124 to account for the deactivated VM.

Subsequently, the virtualization layer determines whether any VMs of the group remain active (506). For example the group management module 122 may access the VM count for the group and determine whether the VM count equals zero. If one or more VMs of the group remain active, the process ends. Of course, the technique 500 may restart in response to another VM being deactivated.

If none of the VMs of the group remain active, the virtualization layer deletes the association of system modules and their assigned memory locations (e.g., base addresses) for the group (508). For example, the group management module 122 may delete the association from the group data index. That is, the information identifying the system modules and their respective memory locations can be removed from the group data index 124 in response to all of the VMs of the group being deactivated.

The virtualization layer releases the memory used to store the information on the association of system modules and their assigned memory locations for the group (510). By releasing the memory, other VMs or other applications can use the memory. The virtualization layer 120 may release the memory in response to all of the VMs of the groups becoming inactive. If a VM of the group is reactivated, then new memory locations for system modules can be identified for the group, for example, using the technique 400 of FIG. 4.

Some implementations described above optimize memory sharing in a virtualized computer system with address space layout randomization enabled in guest operating systems. However, these implementations should not be limited to the address space layout randomization feature as provided by certain Windows operating systems. Instead, they may be used with other techniques provided by guest operating systems, which randomizes the location of certain files or data in memory. Moreover, the location or address for the certain files or data in memory may be stored in different forms. In some implementations, the location or address is a VPN. In another implementation, the location or address is a PPN. In still another implementation, the location or address is a MPN.

Some implementations as described above divide the VMs into groups so that a system module is assigned the same memory location within all VMs in a group. However, the implementations should not be limited to the memory location of a system module. Instead, the implementations may be applied to any position of modules or key data areas which is subject to address randomization feature in a guest OS. Such position includes the base of the executable, and the position of a stack, heap and a library, a system driver, and a dynamic load library. In addition, the implementations should not be limited to just one system module or position of key data areas. The implementations may be used to allocate positions for multiple modules and key data areas.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of optimizing memory sharing on a virtualized computer system including a plurality of virtual machines, the method comprising:

grouping a plurality of virtual machines, including first, second, and third virtual machines, into one or more groups including at least a first group and a second group, so that the first and second virtual machines are in the first group and the third virtual machine is in the second group, and the virtual machines in the first group and the second group are executed on a same physical machine;

and selectively loading a file having the same contents into memory of each of the first, second, and third virtual machines based on determining whether one or more of the plurality of virtual machines are active:

in response to determining that no other virtual machine in the first group is active, initializing the first virtual machine by loading the file to a memory location in a first virtual address space of the first virtual machine, the memory location in the first virtual address space being randomly selected by a guest operating system of the first virtual machine;

storing, in an index, the memory location of the file in the first virtual address space;

in response to determining that the first virtual machine in the first group is active, initializing the second virtual machine by loading the file to a memory location in a second virtual address space of the second virtual machine, the memory location in the second virtual address space being the same as the memory location in the first virtual address space as determined from the index;

and in response to determining that no other virtual machine in the second group is active, initializing the third virtual machine by loading the file to a memory location in a third virtual address space of the third virtual machine, the memory location in the third virtual address space being randomly selected by a guest operating system in the third virtual machine.

2. The method of claim 1, wherein the file comprises one of a system module, an executable, a stack, a heap, a library, a system driver, and a dynamic load library.

3. The method of claim 1, wherein the memory location of the file in the first virtual address space of the first virtual machine is determined using an address space layout randomization (ASLR) feature of the guest operating system on the first virtual machine.

4. The method of claim 1, further comprises:

storing, in a second index, the memory location of the file in the third virtual address space;

determining a fourth virtual machine is in the second group; and loading the file to a memory location in a fourth virtual address space of the fourth virtual machine, the memory location in the fourth virtual address space being the same as the memory location in the third virtual address space as determined from the second index.

5. A system comprising:

data processing apparatus programmed to perform operations comprising:

grouping a plurality of virtual machines, including first, second and third virtual machines, into one or more groups including at least a first group and a second group, so that the first and second virtual machines are in the first group and the third virtual machine is in the second group, and the virtual machines in the first group and the second group are executed on a same physical machine;

and selectively loading a file having the same contents into memory of each of the first, second and third virtual machines based on determining whether one or more of the plurality of virtual machines are active:

in response to determining that no other virtual machine in the first group is active, initializing the first virtual machine by loading the file to a memory location in a first virtual address space of the first virtual machine, the memory location in the first virtual address space being randomly selected by a guest operating system of the first virtual machine;

storing, in an index, the memory location of the file in the first virtual address space;

in response to determining that the first virtual machine in the first group is active, initializing the second virtual machine by loading the file to a memory location in a second virtual address space of the second virtual machine, the memory location in the second virtual address space being the same as the memory location in the first virtual address space as determined from the index;

and in response to determining that no other virtual machine in the second group is active, initializing the third virtual machine by loading the file to a memory location in a third virtual address space of the third virtual machine, the memory location in the third virtual address space being randomly selected by a guest operating system in the third virtual machine.

6. The system of claim 5, wherein the file comprises one of a system module, an executable, a stack, a heap, a library, a system driver, and a dynamic load library.

7. The system of claim 5, wherein the memory location of the file in the first virtual address space of the first virtual machine is determined using an address space layout randomization (ASLR) feature of the guest operating system on the first virtual machine.

8. The system of claim 5, wherein the index is a first index, and wherein the operations further comprise:

storing, in a second index, the memory location of the file in the third virtual address space;

determining a fourth virtual machine is in the second group; and loading the file to a memory location in a fourth virtual address space of the fourth virtual machine, the memory location in the fourth virtual address space being the same as the memory location in the third virtual address space as determined from the second index.

9. A non-transitory machine readable storage medium embodying computer software, the computer software causing a computer to perform a method, the method comprising:

grouping a plurality of virtual machines, including first, second, and third virtual machines, into one or more groups including at least a first group and a second group, so that the first and second virtual machines are in the first group and the third virtual machine is in the second group, and the virtual machines in the first group and the second group are executed on a same physical machine;

and selectively loading a file having the same contents into memory of each of the first, second, and third virtual machines based on determining whether one or more of the plurality of virtual machines are active:

in response to determining that no other virtual machine in the first group is active, initializing the first virtual machine by loading the file to a memory location in a first virtual address space of the first virtual machine, the memory location in the first virtual address space being randomly selected by a guest operating system of the first virtual machine;

storing, in an index, the memory location of the file in the first virtual address space;

in response to determining that the first virtual machine in the first group is active, initializing the second virtual machine by loading the file to a memory location in a second virtual address space of the second virtual machine, the memory location in the second virtual address space being the same as the memory location in the first virtual address space as determined from the index;

and in response to determining that no other virtual machine in the second group is active, initializing the third virtual machine by loading the file to a memory location in a third virtual address space of the third virtual machine, the memory location in the third virtual address space being randomly selected by a guest operating system in the third virtual machine.

10. The non-transitory machine readable storage medium of claim 9, wherein the file comprises one of a system module, an executable, a stack, a heap, a library, a system driver, and a dynamic load library.

11. The non-transitory machine readable storage medium of claim 9, wherein the memory location of the file in the first virtual address space of the first virtual machine is determined using an address space layout randomization (ASLR) feature of the guest operating system on the first virtual machine.

12. The non-transitory machine readable storage medium of claim 9, wherein the index is a first index, and wherein the method further comprises:

storing, in a second index, the memory location of the file in the third virtual address space;

determining a fourth virtual machine is in the second group; and loading the file to a memory location in a fourth virtual address space of the fourth virtual machine, the memory location in the fourth virtual address space being the same as the memory location in the third virtual address space as determined from the second index.

\* \* \* \* \*